United States Patent [19]

Jonsson

[11] Patent Number: 5,557,652

[45] Date of Patent: Sep. 17, 1996

[54] METHOD OF ESTABLISHING COOPERATION WITH A FUNCTIONALITY

[75] Inventor: Björn E. R. Jonsson, Järfälla, Sweden

[73] Assignee: Telefonaktiebolaget LM Ericsson, Stockholm, Sweden

[21] Appl. No.: 561,113

[22] Filed: Nov. 20, 1995

Related U.S. Application Data

[63] Continuation of Ser. No. 18,268, Feb. 16, 1993, abandoned.

[30] Foreign Application Priority Data

Feb. 17, 1992 [SE] Sweden ................................ 9200467

[51] Int. Cl.$^6$ .......................... H04Q 7/38; H04M 3/42
[52] U.S. Cl. .................................. 379/57; 379/207
[58] Field of Search .......................... 379/57, 58, 59, 379/60, 61, 63, 207, 201, 219, 220, 229; 455/33.1, 33.2, 54.1, 54.2; 340/825.44

[56] References Cited

U.S. PATENT DOCUMENTS

| | | | |
|---|---|---|---|
| 4,172,969 | 10/1979 | Levine et al. | 379/58 |
| 4,348,554 | 9/1982 | Asmuth | 379/207 |
| 4,649,567 | 3/1987 | Childress | 455/33.1 |
| 4,763,191 | 8/1988 | Gordon et al. | 358/86 |
| 4,833,701 | 5/1989 | Comroe et al. | 379/60 |
| 4,899,375 | 2/1990 | Bauer et al. | 379/264 |
| 4,910,766 | 3/1990 | Ogino et al. | 379/201 |
| 4,933,966 | 6/1990 | Hird et al. | 379/132 |
| 4,972,466 | 11/1990 | Sasuta | 379/60 |
| 5,040,204 | 8/1991 | Sasaki et al. | 379/61 |
| 5,090,051 | 2/1992 | Muppidi et al. | 379/61 |
| 5,179,374 | 1/1993 | Winger | 340/825.45 |
| 5,307,399 | 4/1994 | Dai et al. | 379/57 |

FOREIGN PATENT DOCUMENTS

| | | |
|---|---|---|
| 0140351 | 5/1985 | European Pat. Off. . |
| 0435449 | 7/1991 | European Pat. Off. . |
| WO89/10044 | 10/1989 | WIPO . |
| WO92/01350 | 1/1992 | WIPO . |

Primary Examiner—Curtis Kuntz
Assistant Examiner—William G. Trost
Attorney, Agent, or Firm—Burns, Doane, Swecker & Mathis, L.L.P.

[57] ABSTRACT

A method by means of which a first node in a first telecommunications network is able to establish cooperation with a functionality present in a second node in a second telecommunication network as a result of the second node initiating the establishment of a connection to the first node by using a reference, called interaction number, as a destination address, this interaction number being associated with the cooperation desired between the nodes. The reference is chosen from among predetermined destination addresses in the first node.

30 Claims, 7 Drawing Sheets

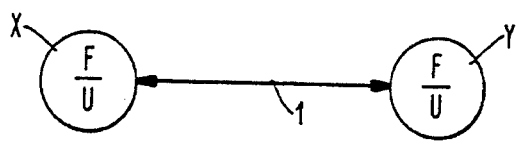
Fig. 1 (KNOWN TECHNIC)
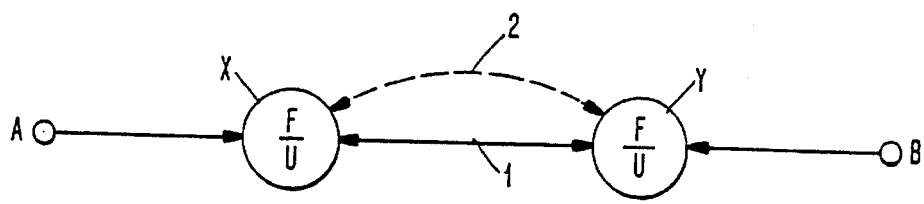
Fig. 2 (KNOWN TECHNIC)
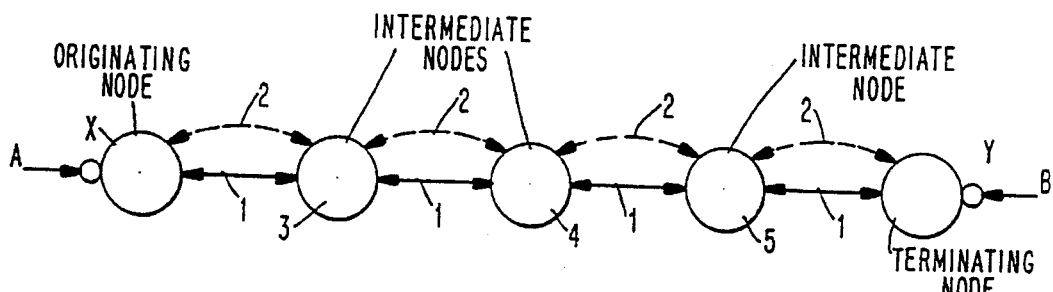
Fig. 3 (KNOWN TECHNIC)
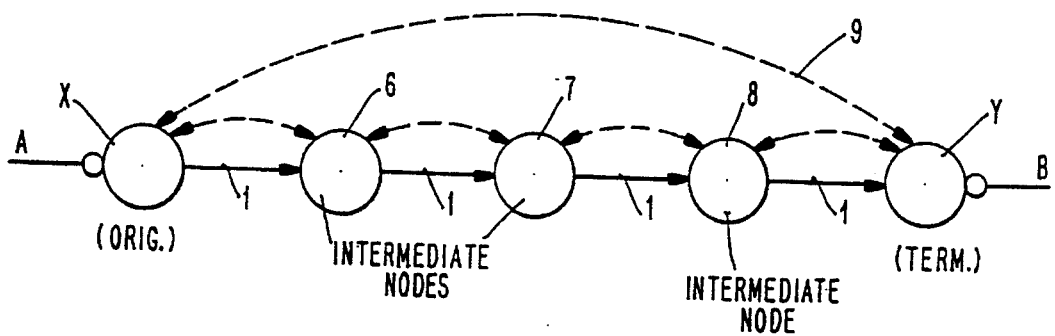
Fig. 4

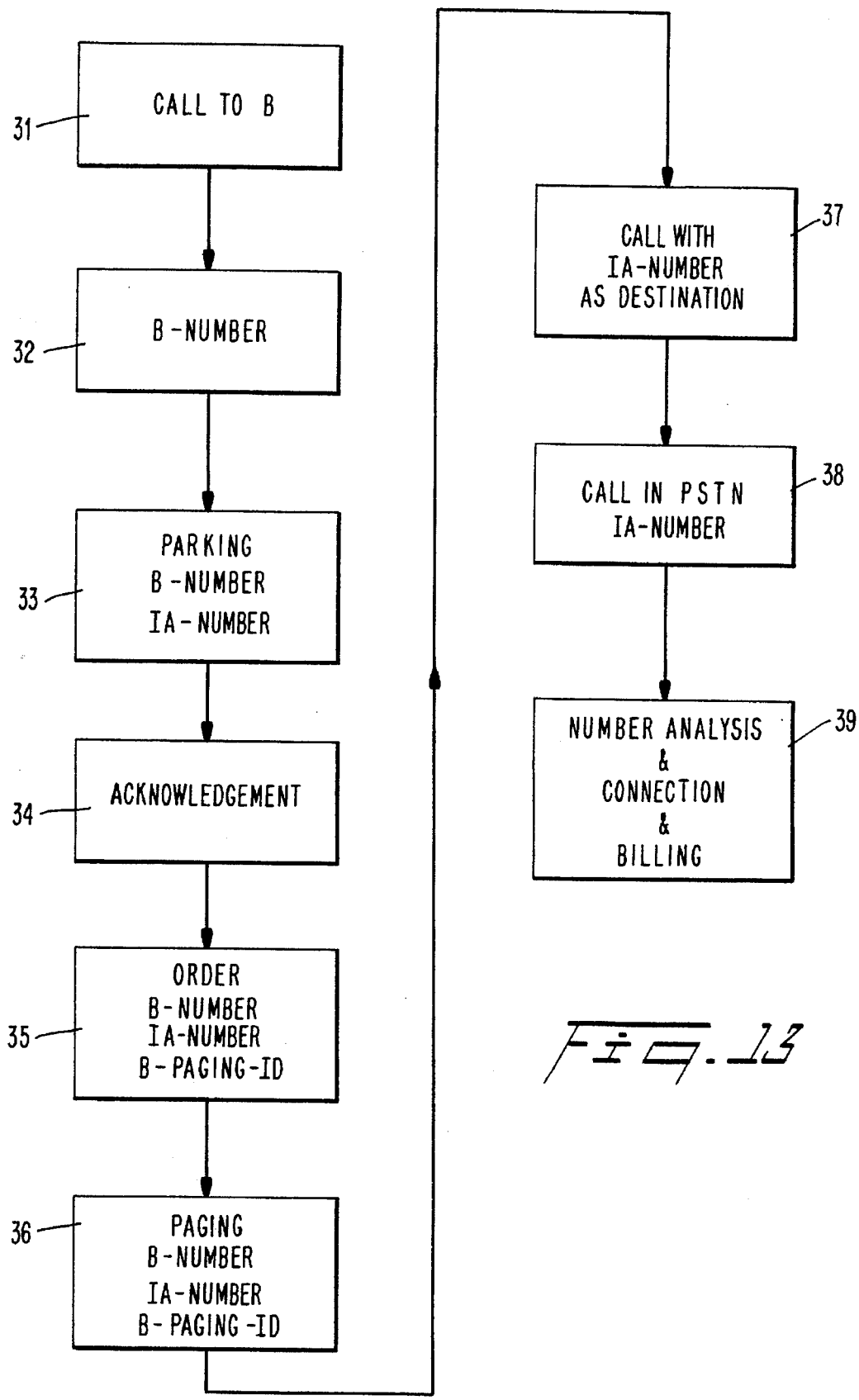

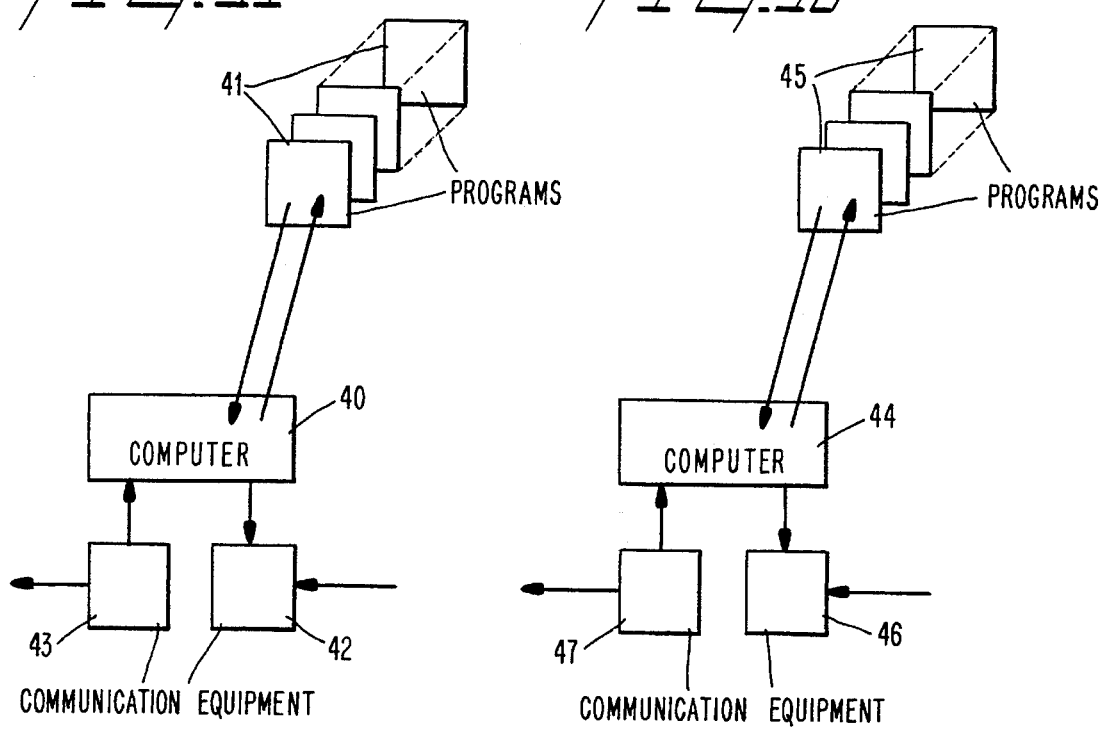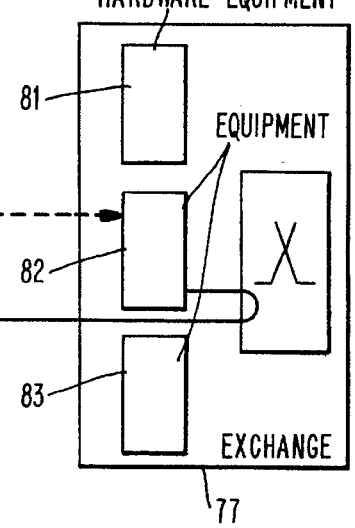

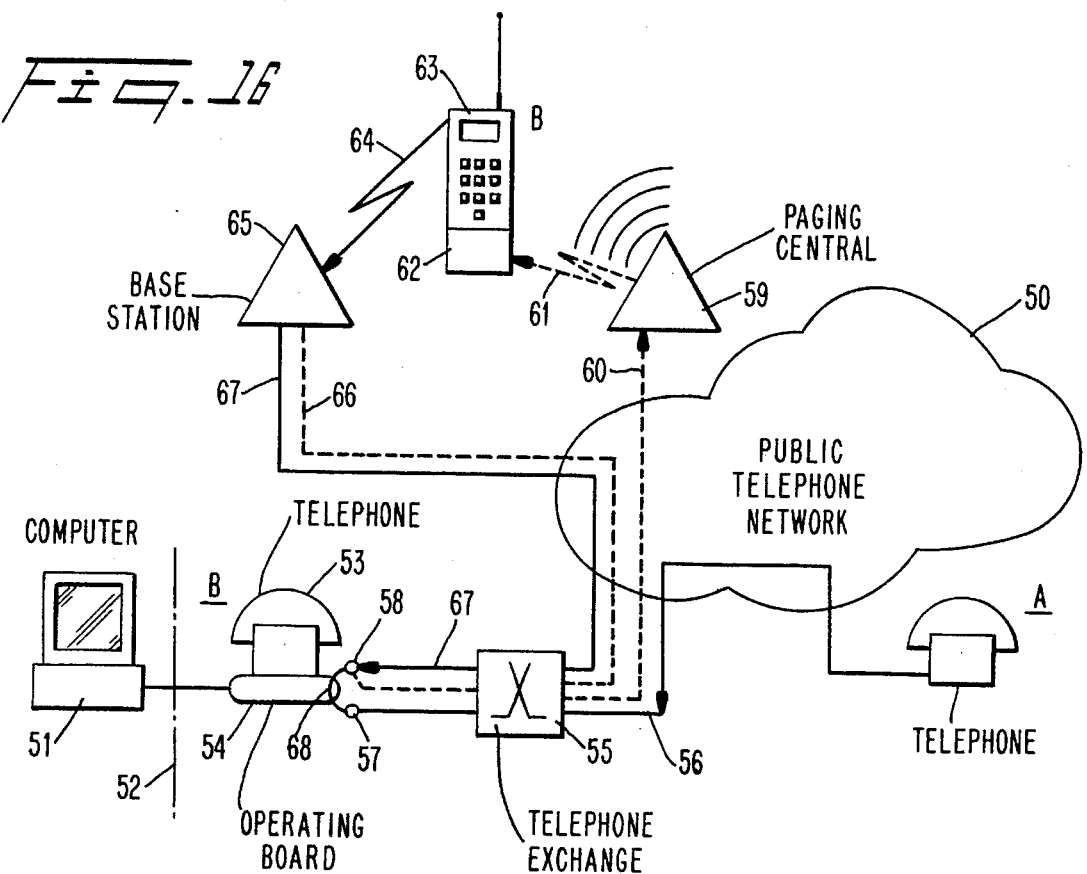
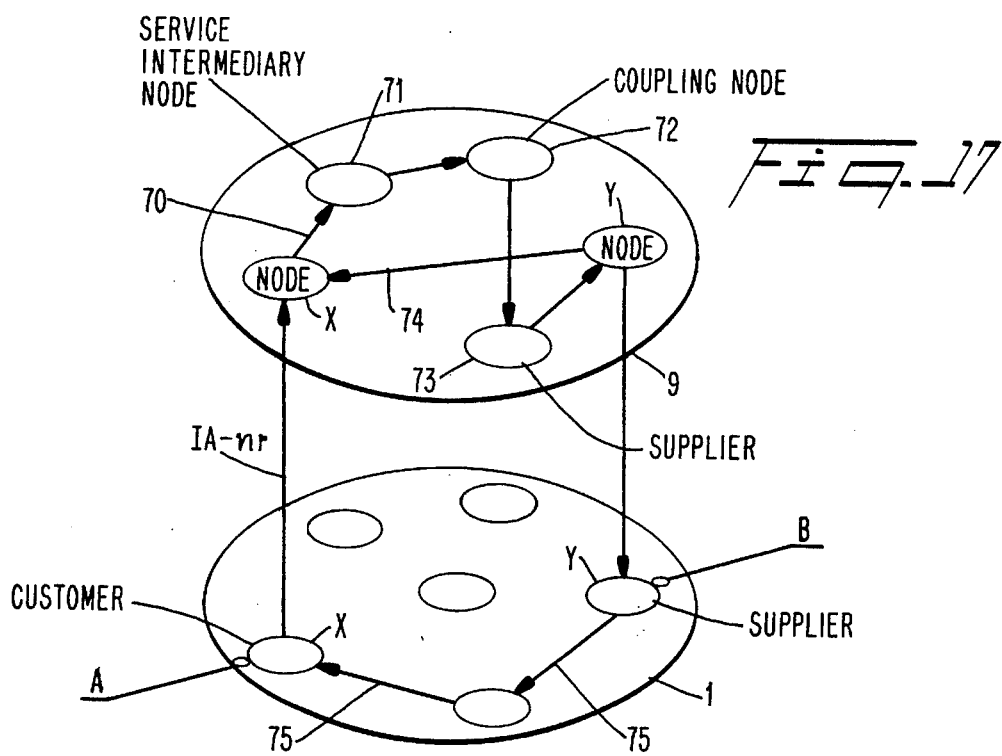

METHOD OF ESTABLISHING COOPERATION WITH A FUNCTIONALITY

This application is a continuation, of application Ser. No. 08/018,268, filed Feb. 16, 1993, now abandoned.

The present invention relates generally to the field of communication services that are performed through selected telecommunication networks. The invention relates in particular to a service interaction method. A service interaction method is a method of establishing cooperation between two functionalities via a telecommunication network.

The present invention is related to the following five patent applications, to which the following description refers:

1) "A Method of Establishing a Connection", U.S. patent application Ser. No. 08/018,214;
2) "A Method of Providing an Intelligent Network Service", U.S. patent application Ser. No. 08/018,197;
3) "A Method of Supporting Communication", U.S. patent application Ser. No. 08/018,213;
4) "A Paging Method", U.S. patent application Ser. No. 08/018,212; and
5) "A Method of Organizing Communication", U.S. patent application Ser. No. 08/018,223.

These applications are enclosed as an annex to the present description and describe mechanisms which can be used in the method according to the present invention.

TECHNICAL BACKGROUND ART

The term communication services is meant to mean conventional tele-phony services, telex services, datapack services, datel services, telefax services, videotext services, ISDN-services, mobile telephony services, personal paging services, tele-point-services and general communication between two or more parties. The services recited above are only examples of the services possible and are not intended to limit the scope of the invention.

The term telecommunication network is normally meant to mean the telephone networks, telex networks, circuit connected data networks, picture information transfer networks, private telecommunication networks, radio networks, satellite communication networks and general carriers of the communication services, such as analog transmission, digital transmission, synchronous, multiplex or asynchronous multiplex transmission, ATM, etc., for example. These networks are recited solely by way of example and the invention is not restricted thereto.

The term functionality is meant to mean the ability to perform an operation in a telecommunication network. Examples of functionality include activities and services that can be performed in the telecommunication network. Examples of functionalities include an enquiry to establish a connection path or route between two parties, digit analysis, billing or ticketing. Although not necessary, the functionality may require the availability of dedicated equipment for carrying out the functionality. For instance, if the functionality is to receive tones and to analyze tones, it is necessary to make a tone receiver accessible. Other examples of functionalities include voice-controlled speech information, number translation service, conference calls. Other examples of functionality include the functionalities described in the aforesaid five Swedish patent applications, namely communication in the form of a meeting, personal paging, a method of establishing cooperation with a functionality, meeting connection establishment and communication via intermediaries.

The term connection is meant to mean a circuit-coupled connection or a package-coupled connection. The term to establish a connection is meant to mean in the circuit coupled case that a circuit-coupled connection is established between two hardware terminal devices (or equipment) and in the package coupled case it is meant that a package-coupled connection creates relationships between logic channels on node-interconnecting physical links which. The term to originate or to terminate a connection is meant to mean in the circuit-coupled case to connect originating or terminating equipment to a circuit-coupled connection, and in the package-coupled case to create a session between applications in originating and terminating nodes respectively.

The term user is meant to mean in the following a human user or a computer-based application which utilizes communication services. The application may be achieved with hardware, software and combinations thereof. The word "party" is synonymous to the term user.

The term terminal is meant to mean equipment which is connected to a telecommunication network and which makes the telecommunication services of the network available to a user.

The term port either refers to an access port or to a transit port. An access port is a location where a dedicated terminal is connected to a telecommunication network. An access port is associated with a destination address which goes to an end user. In the case of a standard telephone network, the access ports are located in a telephone station. In the case of the ISDN-network and the mobile telephone network, the access ports are found in a terminal. A transit port is a port in a connection between nodes. A transit port is not associated with any particular destination address, and can be used to establish any selected connection with a final destination. The final destination is given by the destination address. A transit port can transfer a call to another node or can receive a call from another node.

The final destination of a call is a terminal which is identified by a destination identity. The terminal can be present in the same node as a transit port or in some other node to which the call shall be further connected.

One fundamental feature of present-day communication services is that when a party, hereinafter called A, wishes to communicate with another party, hereinafter called B, A sends a call to B, whereupon a connection is established between A and B. The call and the establishment of a connection route is a coupled sequence. By this is meant that the information which A uses in the call, namely information relating to the identification of B's access point in the telecommunication network, causes a connection route, or path, to be established between the parties. This connection can either be circuit-coupled or, in the case of non-continuous transmission methods, a so-called virtual connection, e.g. a package-coupled network, ATM-network (asynchronous transfer mode), etc. Traditionally, a connection is established by establishing a route from an origin to a destination. The connection route through the telecommunication network is controlled by fixed, so-called routing tables which are drawn up when configuring or reconfiguring the network. The routing tables may sometimes permit alternative selections, based on local accessibility information.

The traditional communication network is encumbered with many drawbacks. A first problem concerns handling of the resources of the communication network. Firstly, the communication network is, in itself, a resource which is utilized uneconomically in the traditional method of providing communication services. For example, when party A calls party B, so as to establish a connection through the network from A to B, and party B does not accept the call, the network resources have been used unnecessarily. The same applies when party B is engaged. The case is dependent on the predominant use of present-day networks of channel-associated signalling. This involves establishing a signalling connection, which is then used for speech purposes. With common channel-signalling, which is used primarily in the long-distance network, the signal connection is established with the aid of the data package, or packet, whereas the speech connection, the expensive part of the communication, is not established until B answers. Common channel-signalling is scarcely used in local networks. Secondly, the majority of all established connections do not require party B to act immediately on the information that A will transfer.

In the aforesaid cases, the network resources are either used unnecessarily or are utilized in real time, although it would be possible to utilize the resources at a later time.

Another drawback with the known telecommunication networks is that when party A wishes to communicate with party B, it is necessary for party A to direct the call to the network, since the network must be activated in order to establish the connection with party B. In turn, this requires the network to have knowledge of the access port of party B in the telecommunication network. Furthermore, it is necessary for the telecommunication network to select the connection route between party A and party B. This is achieved with the aid of fixed routing tables. Fixed routing tables, however, are a disadvantage, for instance in the case when a large number of users located within a restricted, local geographic area are called through the telecommunication network at one and the same time, resulting in congestion on certain trunk lines leading to the local area. On such occasions, the node will normally have several unused trunk lines from other geographic areas. The routing tables, however, do not permit these unused trunk lines to be used temporarily for the purpose of relieving the traffic to the local area. By way of example of temporary geographic traffic concentrations can be mentioned, large sporting events of a temporary character, among others.

When seen from the aspect of party B, present-day telecommunication networks are also rigid in structure and slow in redirecting the call to B when B moves from its access port in the telecommunication network. In present-day telephone networks, this problem is solved by service such as "temporary transfer" (diversion) or "redirection". However, if it is necessary for party B to change its access identity permanently, the problem will remain, i.e. that the party who wishes to reach party B must have knowledge of the new access identity. The mobile telephony solves this problem, but at the price of requiring the network to continuously register where B (or B's terminal) can be reached.

The U.S. patent application Ser. No. 515 836 filed on the 27th Apr. 1990 with the title "Apparatus and Method for Directing Calls to Mobile Telephone Subscribers", having the same Applicant as the present application, describes the mobile communication system in which the home exchange of a mobile subscriber is aware of the probable location of the subscriber. Upon receipt of a call, the home exchange requests the exchange where the mobile subscriber is probably located to page the subscriber and to connect the subscriber to a speech channel. This is reported to the home exchange only when the process has been successfully carried out, whereupon the home exchange orders a connection from A to B to be established through the network.

This avoids unnecessary coupling of a call connection from A to the home exchange, as in the case of the earlier used method, and, instead, only one signalling process is effected between A and the home exchange. This signalling process may be carried out, e.g., via CCITT signal system No. 7.

The U.S. patent application Ser. No. 686 600 filed on the 17th Apr. 1991 with the title "A Communications System for Integrating a Paging System with Cellular Radio Telephones" and having the same Applicant as the present application, describes a cellular mobile telephony system having mobile telephones which have pagers built therein. If the mobile telephone is disconnected but the pager is active and an incoming call is made to the mobile telephone, the wide range paging network sends a paging signal which is received by the pager of the mobile telephone, this pager "alerting" the mobile telephone in response to the call and causes the telephone to register itself. The network now steers the call to the mobile telephone by repeating the paging process but now through the cellular mobile telephone network.

The described system includes cooperation between the fixed telephone network, the paging network and the mobile telephone network.

The European Patent Specification No. 140 351 describes a system for increasing the range of cordless telephones. A cordless telephone cooperates via a radio connection with a fixed telephone which has access to the telephone network. The range of the cordless telephone is restricted to the close area around the fixed telephone. In order to increase the range so as to enable a mobile cordless telephone A-MOBIL located within the range of its fixed telephone A-FIX to establish a connection with another mobile cordless telephone B-MOBIL which has its own fixed telephone B-FIX with a range which does not cover the range covered by A-FIX, it is proposed that both of the telephones A-FIX and B-FIX are provided with an auxiliary unit which cooperates, via a switch in the telephone network, with a personal paging system having a range which extends to both A-TEL and B-TEL. The connection from A-MOBIL to B-MOBIL is established by making a call from A-MOBIL and giving the telephone number of B-MOBIL. The fixed telephone A-FIX of the A-MOBIL adds to the B-telephone number an A-FIX-ID which is sent to the exchange and from there to the person paging system. A-FIX then releases its connection with the exchange. The paging signal received by B-MOBIL includes A-FIX-ID. The person served by B-MOBIL can then make a call via another fix-TERMINAL, here called X-FIX, and therewith give A-FIX-ID as the destination. The call passes from B-MOBIL, via X-FIX, via the exchange to the released A-FIX and contact between the parties is established. The communication method described in the patent specification can be described roughly as a conventional A-number transfer system in which the A-number is transferred via the paging network. One drawback with this known system is that A-FIX must release its connection with the exchange in order to be able to receive a call from B-MOBIL. This implies the additional drawback that anyone, whomsoever, is able to call to A-FIX after A-FIX has released its connection with the exchange. Despite A-MOBILE having ordered a call with B-MOBIL, a third party is thus able to call A-MOBIL. The exchange is unable to ascertain which of the incoming calls to A-FIX shall be allowed to pass through. The exchange is ignorant as to whether or not there is a relationship between A-FIX and B-FIX, and neither is the exchange able to handle such a relationship. Another drawback with this system is that all fixed telephones and all mobile telephones and the paging system must be especially designed in order to function together. This involves very high investment costs in order to obtain a system which functions.

There is used in Taiwan a communication system in which when a subscriber A wishes to talk to a person B owning a mobile telephone, subscriber A requests paging of party B and gives his A-number. Party A then releases his connection. The person paging process involves transferring the A-number to the paging apparatus of party B. Party B now calls the A-number on his mobile telephone. A connection is thus established from B to A. A drawback with this method is that the reference, i.e., the A-number, transferred to B points to hardware, i.e., A's telephone apparatus, and it is necessary for A to release his apparatus in order to be able to establish a connection from B to A. Another drawback is that A is not certain that it is B who is calling when A's telephone rings. It is quite possible that some other subscriber rings A before B rings.

SUMMARY OF THE DISCLOSURE

The communication service according to the basic concept of the present invention is divided into a separate negotiating phase and a connection establishment phase. The connection establishment phase is not initiated until both parties have accepted that communication shall take place and when the parties are aware of their respective access points. By separate, it is meant here that the aforesaid coupled sequence between call and the establishment of a connection route is broken both in time and in space. This interruption in the coupled sequence means that the negotiating phase of a communication service is separate from the establishment of a connection route. A connection route is not established until both parties are agreed that the communication phase of the connection shall take place. In this way, the point in time at which a connection route is established is delayed in relation to the time at which the call was made, although the invention does not include the establishment of a connection route in direct conjunction with the time at which the call was made, provided that certain conditions are fulfilled.

The fact that the coupled sequence is broken in space means that a connection route between the parties need not necessarily be established over the same telecommunication network as that over which the negotiating phase or phases takes or take place. However, the invention does not exclude maintaining the space coupling, i.e., of using the same telecommunication network over which the call was made in communication between the parties.

As a result of splitting the coupled sequence, a connection will now no longer be considered as an establishment of a route from an origin to a destination, but as an establishment of a route between two equal parties, wherein a route can be established from A to B or from B to A or from A to an intermediate point M(IA(A)) and from B to an intermediate point M(IA(B)), whereafter M(IA(A)) is connected to M(IA(B)). The intermediate points M(IA(A)) and M(IA(B)) are located on a telecommunication network which can be reached by both parties. Splitting of the coupled sequence also means that a call is considered as a service order. Traditionally, a call is considered as an order, or request, for the establishment of a connection route to a destination. In the new approach, dialling of a number on a telephone apparatus for instance only means that party A orders a communication service. The service can, but need not be associated with the establishment of a connection route.

When the inventive concept is applied to the establishment of a connection between two parties, wherein a first party, party A, located in a node X, orders a connection, via a signal network, with the second party, party B, who is located in node Y, the connection order is released from being coupled to the establishment of a coupling or connection route. The connection order includes information concerning the functionalities to be connected with each other. The initiative of establishing the connection, i.e., initiation of the establishment of a connection route, can be taken by the called party, or by the calling party, depending on the circumstances. Those networks through which the coupling route is established need not have knowledge of the functionality or the service to be exchanged between the parties. All that these intermediate networks need do is to establish a connection route and, of course, act as bearers for the information to be exchanged between the parties.

As previously mentioned, when the aforedescribed method is applied to establish a connection between the parties in intelligent network services, it is necessary for the network through which a connection route is established between the parties to be aware of the telecommunication service that the service supplier delivers over the connection route. This means, among other things, that the service supplier himself is permitted to choose the method in which he desires to deliver the service requested. The service supplier may himself own the equipment used to supply the service and the equipment need only follow the signalling protocol of the network operator for access to the basic communication service, i.e., standardized network protocol for coupling connections. The network need not include protocol for advanced services. This is the subject of copending patent application entitled "A Method of Providing an Intelligent Network Service".

The invention is intended to provide a fundamental mechanism for achieving cooperation between two functionalities, each occurring in a respective node, X and Y respectively, in that the node X which orders, or requests, a connection with the other node Y required for said cooperation assigns to the connection a temporary reference which is associated with the desired cooperation concerned.

Another object of the invention is to provide a method of communication in which the temporary reference (a) is acknowledged solely for the node Y which is to supply the connection, called the supplier, and (b) is used by the supplier as a destination address when establishing a connection that originates from the node Y and terminates in the node X.

A further object of the invention is to provide a method of communication which enables a node to identify an incoming call which use the temporary reference, on the basis of said reference.

Still a further object of the invention is to provide a method of communication which enables equipment found in existing communication networks to be used.

Yet another object of the invention is to provide a method of communication which enables a connection route to be established between a connection customer and a connection supplier through one or more networks or within one and the same node, without the networks or the node needing to have knowledge of the service to be transferred on the connection.

Another object of the invention is to provide a method of communication in which the connection order, or request, can be transferred to a connection sub-supplier through the initiative of either the connection customer or the connection supplier.

Yet a further object of the invention is to provide a method of communication which enables the aforesaid reference to be supplemented with a password by means of which the supplier identifies himself to the customer.

The aforesaid objects can be achieved, for instance, by selecting the aforesaid reference from a predetermined destination address series which belongs to that node which assigns the reference. When the network is, for instance, a telephone network, there is given a destination address of a telephone number selected from a predetermined number series.

BRIEF DESCRIPTION OF THE DRAWINGS

Various embodiments of the invention will now be described in more detail with reference to the accompanying drawings, in which FIG. 1 is a schematic illustration of a known, conventional telecommunication method;

FIG. 2 is a schematic illustration of a known, conventional telecommunication method;

FIG. 3 is a schematic illustration of a known, conventional communication method in which connections are established with the aid of intermediate nodes;

FIG. 4 is a schematic illustration similar to FIG. 3 and illustrates a conceivable communication method which deviates from the known method but which does not constitute the present invention;

FIG. 13 is a flow sheet illustrating the communication method illustrated in FIG. 12;

FIG. 14 is a block schematic illustrating a connection customer who uses the inventive communication method;

FIG. 15 is a block schematic showing a connection supplier used in the inventive communication method;

FIG. 16 illustrates the application of one embodiment of the invention for several mutually cooperating networks;

FIG. 17 illustrates another example of the invention when applied to intelligent network services; and FIG. 18 illustrates still another example of the invention when applied to coupling stations in a telecommunication network.

DETAILED DESCRIPTION OF THE DISCLOSURE

Figure 5:
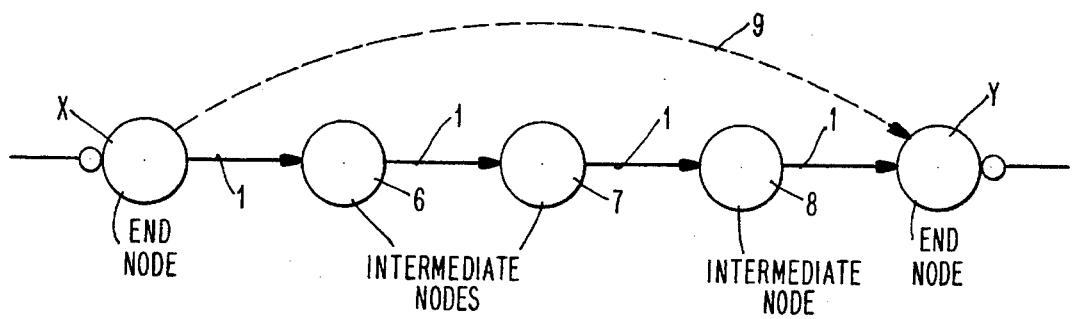
FIG. 5 is a schematic illustration of the inventive communication method.

Before describing the invention, it is appropriate to explain certain basic terms and, in conjunction therewith, to introduce certain new terms which can be used to describe the invention. Once these terms have been defined, the technical problem fundamental to the present invention, i.e., of establishing a connection between parties, can be defined readily with a starting point from the communication requirement of the parties concerned. This approach as to how a connection can be established differs from the approach applied at present, where the establishment of a connection is considered from the aspect of the telecommunication network. A communication service should be considered as communication between users and not, as at present, considered as communication between equipment which is connected to, or can be connected to, a network and over which the network governs. In the novel approach, the networks are instead considered as auxiliary means for establishing connections.

FIGS. 1–4 illustrate units and are used to describe terms which are typical in conjunction with the establishment of a connection over a telecommunication network. By telecommunication, it is meant communication over distances. Equipment is required to effect such communication. The various equipment required together form a telecommunication network. This network includes nodes. A node may be a switch, a subordinate network, a LAN (Local Area Network, or the like) and is comprised of a local collection of equipment or of one single local equipment. The equipment concerned has the functionality, i.e., is able to perform the function, required in order for the equipment to be able to supply a local service within the node.

FIG. 1 illustrates a local network having a node X, a node Y and a schematically illustrated connection 1 between the nodes. The node X may, for instance, be a local exchange, such as a PABX-exchange (Private Automatic Branch Exchange). A large infrastructure will include many nodes and connections therebetween. A network of nodes is created by tying the nodes together. Users in different nodes are then able to communicate with one another. In order to make this possible, it is necessary for functionalities in the nodes of both users to cooperate with one another. The present invention is directed to the manner in which such cooperation is achieved. The invention assumes as its starting point that nodes, functionality, connections and equipment are found. These terms have been shown in FIG. 1 where F signifies functionality and U signifies equipment. X and Y respectively signify nodes that have functionality and equipment, while reference 1 symbolizes the connection between the nodes X and Y.

FIG. 2 illustrates the manner in which a conventional, local network operates. When a user A desires contact with another user B, it is the party A which takes the initiative in establishing the connection and which, with the aid of the functionality in his node X, orders communication with party B in the node Y. A is called the originating user and B is called the terminating user. Among the equipment found in the node X is equipment which controls the establishment of a connection 1 from X to Y. The user A or B may be a person, a computer or some other network which uses the network shown in FIG. 2. Under all circumstances, a user is a party who (which) wishes to utilize the function found in a node. Traditionally, a connection is established from the node X of the originating user A to the node Y of the terminating user B. The terminating node Y has a functionality and equipment which can be used by the terminating user B. The originating node N exhibits activities in relation to the node Y and the node Y has activities in relation to the node X. These activities must be coordinated with one another, i.e., an interaction must occur between the activities of the nodes. This interaction is illustrated schematically by the broken line 2. In the case of a telephone call, the activities, e.g. detection of a telephone receiver being lifted and replaced, telephone ringing, establishment and disconnection of a connection route, billing, etc., are activities that must be coordinated sequentially, in time sequence, in order for a telephone conversation to take place.

FIG. 3 illustrates a larger network which includes direct connections between the originating node X and the terminating node Y. When A in the originating node X desires to be connected with B in the terminating node Y, the connection is established via a number of intermediate nodes 3, 4, 5. These intermediate nodes have nothing to do with the users A and B but merely assist in establishing the connection. Using the new terminology, the nodes 3–5 can be designated connection intermediary nodes. We have thus three types of nodes, namely originating nodes, terminating nodes and connection intermediary nodes. The connection intermediary nodes have no involvement with the communication services. The service requested by the user A is dealt with by the originating node X and the terminating node Y. The role distribution is thus now established. In the network illustrated in FIG. 3, signalling between the nodes is also required. This signalling is necessary in order for the functionality in a node to cooperate with, or coordinate with, the functionality in another node. In the terminology of the FIG. 2 illustration, this coordination is referred to as interaction and is shown by the broken arrows 2 in FIG. 3. Respective interaction between the connection intermediary nodes and between a connection intermediary node and an originating or terminating node are normally not identical, although the broken arrows are each labeled with the same identical reference numeral 2. The interaction and service are controlled traditionally via the same physical lines. For instance, when a telephone receiver is lifted, the resistance in the lines changes therewith producing a signal which indicates that something is about to happen. In modern-day communication systems, such signals and the connection lines are separated. There is a connection which is established on one line while on other lines signals are sent which coordinate the activities of the nodes mutually and which are related to the connection concerned. The signals, however, need not pass along the same route as that used for the connection. When the connection is viewed functionally, however, the signals pass from node to node to node in parallel with the connection 1. Traditionally, signalling is always initiated from the originating node X.

FIG. 4 illustrates a network which is modified in relation to the network illustrated in FIG. 3. FIG. 4 illustrates the possible configuration of a network with a starting point from the concepts fundamental to the present invention. The originating node X and the terminating node Y are in unique positions. It is these nodes which need to "speak" to each other about the service concerned, i.e., these nodes need mutual interaction in order to negotiate about the service requested by the user. Similar to the case of the connection intermediary nodes 3–5, the connection intermediary nodes 6, 7, 8 of the FIG. 4 illustration also need to "talk" mutually, but then only about the connection itself. The purpose of a connection intermediary node is to ensure that a connection incoming on a physical port is sent further to the connection destination port. Thus, we differentiate here between two types of interaction, namely between on one hand a communication service interaction which is solely concerned with the service and on the other hand a connection service interaction which is only concerned with the establishment, i.e., coupling, of the connection. Those signals used in the connection service interaction need only disclose the destination of the connection. Each existing network can accomplish this, irrespective of the type of communication service for which the networks are intended. The basic property of a present day telecommunication network is one of establishing a connection from an originating point to a terminating point, with the aid of a destination address. The destination address can be expressed in numbers or with other alphanumerical information.

When a connection is coupled from connection node to connection node, it is not necessary for the connection to have knowledge of the possible services or functionalities found in the different connection nodes. The establishment of a connection is not concerned with the actual communication service. When the connection is dealt with in the connection nodes, this is effected in a manner which has no relationship with the purpose for which the connection shall be used, and handling of the connection takes place solely from the basis that the connection shall be made. The purpose for which the connection is used is decided by the communication service. In FIG. 4, it is this service which takes the initiative in establishing the connection, i.e. the original node X which shall be able to negotiate with the terminating node Y as to the conditions for the communication service, as illustrated by the broken interaction arrow 9. Examples of communication service conditions include the type of service concerned, authorization, billing and all other data concerned with the service. The connection intermediary nodes 6–8 are not involved with this negotiation in any way and, because of these nodes, have the sole purpose of coupling the connection between the nodes X and Y.

According to the traditional method of establishing a connection, it is the party taking the connection initiative which also controls the establishment of a connection route, by establishing the connection forwards to the final destination. This is so in all existing networks.

It is also obvious, however, that when negotiation between the nodes X and Y is complete with regard to the communication service concerned, the connection service could equally as well be originated from the terminating node Y, and that the connection could be coupled from Y to X. The present invention avails itself of this fact and is further developed in the manner illustrated in FIGS. 5–7.

FIG. 5 illustrates a network which utilizes the inventive method of communication. FIG. 5 illustrates two end-nodes X and Y, both of which agree that they shall be connected one with the other. The manner in which the nodes X and Y have come into contact with one another forms no part of the present invention. The end-nodes may have come into contact with one another in different ways, with the use of a network which is different from the network in which the connection was established. Each end-node has respective programs which have established contact with one another and have arrived at a decision to establish a connection. The end-nodes negotiate with one another for the conditions for the connection in accordance with the above and in addition, which is novel, the nodes reach an agreement as to which node shall have the role of connection supplier and which shall have the role of connection customer. According to the present invention, the connection supplier is the node from which the connection shall be established to the node which has the part, or role, of the connection customer. Depending on what the end-nodes shall do and depending on the assumptions of respective end-nodes, a choice is made between the nodes X and Y as to which of them shall be the customer and which shall be the supplier. The criteria used in this respect for dividing the roles between the parties concerned are, for instance, that the customer is chosen in the node which can be selected from among several nodes.

In the situation where the one party is pre-given, e.g., a party who lifts a telephone receiver and who is lo-cated at a given place and will establish a connection immediately, it is natural that this party shall be the connection customer while the party who supplies the connection, e.g. a resource located at many points or loations in the network, is the party who shall have the role of connection supplier. Thus, the party which cannot be exchanged and which, for instance, is found at only one place in the network is thus the party that shall have the customer role, while the supplier is the party which may be located at several places in the network, the party that can be selected, the party that can move, that is mobile, portable or moveable in any other way within the network.

Analogously with distinguishing between communication service and connection service, it is possible also to distinguish between the functionalities which concern the communication service. The communication service is divided into a connection customer, and a connection supplier. Similarly, the functionality concerning the connection service can be divided into a connection creator and a connection receiver.

Figure 8:
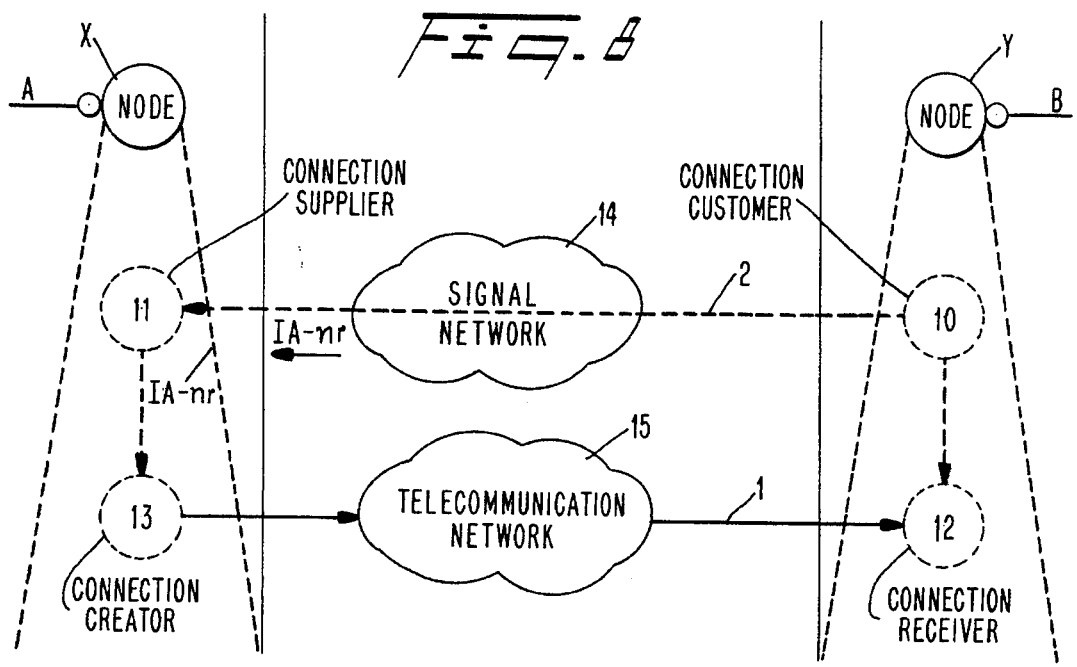
FIG. 8 is a schematic illustration of an alternative embodiment of the communication method illustrated in FIG. 6.

After having established a customer-supplier role allocation, two cases can occur, namely that the party taking the initiative in the communication is either (a) the customer or (b) the supplier. These two cases are illustrated in FIGS. 6 and 8 respectively.

Figure 6:
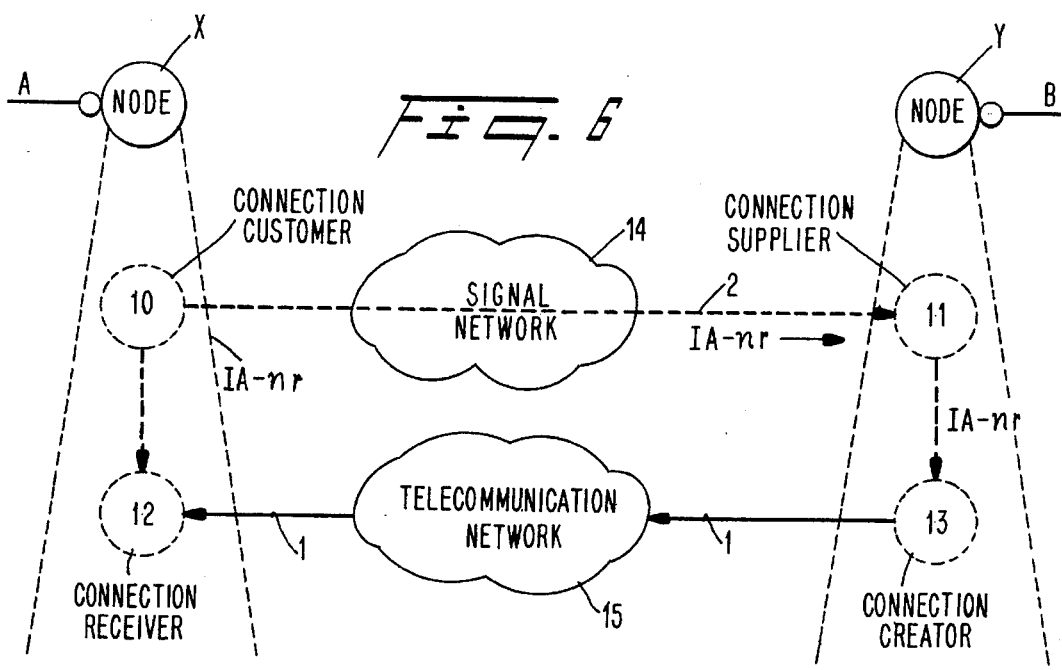
FIG. 6 is a schematic illustration of one embodiment of the inventive communication method.

FIG. 6 assumes that the functionality in the node which initiates communication, the left node X in FIG. 6, is divided into a connection customer and a connection receiver, whereas the functionality in the node which receives the call, the node Y in FIG. 6, is divided into a connection supplier and a connection creator. The connection customer is referenced 10, the connection supplier is referenced 11, the connection receiver is referenced 12 and the connection creator is reference 13. Using the new terminology, the service requested by the connection customer is "connection establishment". The connection customer thus orders the service connection. The problems have now been cleared. Thus, there is found a connection customer and a connection supplier which are solely concerned with how the connection is created and nothing more.

The connection customer includes software and equipment which is found in the node X. The program and its equipment can interact with a connection supplier in the node Y, via a signal network 14. Similarly, the connection creator is comprised of software and equipment capable of interacting with the connection receiver, via a telecommunication network 15, which solely serves as a coupling network. For each connection order arriving from a user (not shown), normally realized in the form of software, the connection customer creates a connection customer individual and a connection receiver individual, whereas the connection supplier creates a connection supplier individual and a connection creator individual for each connection order received from the connection customer. All of these individuals are preferably data records which include a number of fields containing information concerning the connection and concerning references to program and equipment. The individuals cooperate with one another, via the programs, to create and create the connections.

According to the present invention, the node which has the role of connection customer is required to create a connection customer 10 which, via interaction signals 2 transmitted on the signal network 14, signals to the connection supplier 11 and orders a connection therefrom. At the same time, the node containing the connection customer 10 shall function as a connection receiver 12. The node containing the connection supplier 11 shall, at the same time, function as a connection creator 13. The connection is assigned a reference, so that the connection customer 10 is able to refer to the connection requested.

The reference refers to a destination in the node of the connection customer. More specifically, the reference is included in the address series for the customer node, so that surrounding nodes "believe" that a subscriber is found in the customer node. Furthermore, the addresses in the address series used as a reference are chosen from among those addresses which have no equipment connected to the customer node. The address concerned may be a telephone number, electronic-post address, data communication address, etc. Hereinafter, the reference is referred to as an IA-number (Interaction-number) or an IA-identity. The IA-number may be comprised of digits, alphanumerical signs and other symbols such as *, #, etc. and can be reused. It should be noted that an IA-number can be, although need not be associated with an access port in the node which assigns an IA-number. In the embodiment illustrated in FIG. 6, the IA-number is transmitted over the signal network 14 and then, in connection with coupling a connection, over the network 15 as a reference.

In FIG. 6, it is assumed that A makes a call to B. A is coupled to the node X, where the call enters on a port identified with a small circle. The call is parked on this port and the node X performs a B-number analysis and finds that the called B-number lies in node Y. The connection customer 10 in node X now creates a connection customer individual and assigns an IA-number to the call. A connection order containing, among other things, the IA-number is sent to the node Y over the signal network 14. At the same time as the connection customer 10 sends the connection order to the connection supplier 11, the connection customer 10 sends the IA-number to the connection receiver 12 together with information concerning the purpose for which the IA-number has been assigned, i.e., in the present case to "establish a connection with the port on which the call from A has arrived". The connection receiver 12 thus has pre-knowledge of the IA-number. In response to receiving the connection order, the connection supplier creates a connection supplier individual and a connection creator individual. The connection creator individual initiates coupling of a connection to the destination B, by using the B-number, and a connection to the node X, through the coupling network 15, using the IA-number as the address of X. When the connection from Y's connection creator individual arrives on one of the input ports of the X-node, i.e., of the customer node, the connection receiver 12 is aware of the purpose for which the IA-number was assigned and connects the parked connection from A with the incoming connection from B.

The connection is thus created from the supplier of the communication service. It should be noted that the IA-number does not disclose incoming ports in the node X, but an address which has the node as destination and a consecutive number, or a reference number, which is compatible with the number plan/address plan, as an order reference. A supplied connection coupled up to the node X may, for instance, arrive on any one of perhaps thousands of ports. It is irrelevant on which port the connection arrives. The incoming ports are intended solely to receive supplied connections. However, because the supplied connection has used the IA-number as an address, the connection receiver is aware that the connection that has arrived on an incoming port and which has used the IA-number as an address shall be handled in a particular manner. The connection receiver checks for which purpose the IA-number has been assigned and then takes the requisite steps.

Figure 7:
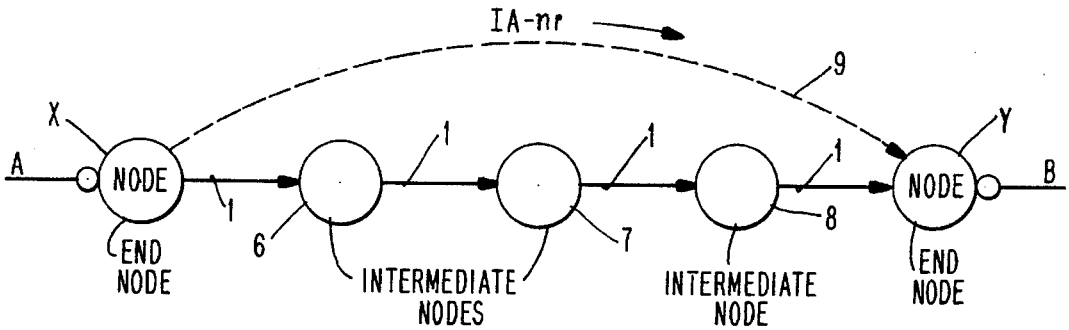
FIG. 7 is a schematic illustration of the connecting route of a connection between A and B, using the method illustrated in FIG. 6.

When the connection has been well established from the connection creator to the connection receiver, the connection follows the route illustrated in FIG. 7 and the connection establishment is administered by the connection intermediary nodes 6, 7, 8.

When the connection between A and B is to be broken, the connection is broken-down and the connection customer 10, the connection receiver 12, the connection supplier 11 and the connection creator 13 are annulled and the IA-number is released. The same IA-number can then be reassigned to another connection order.

Figure 9:
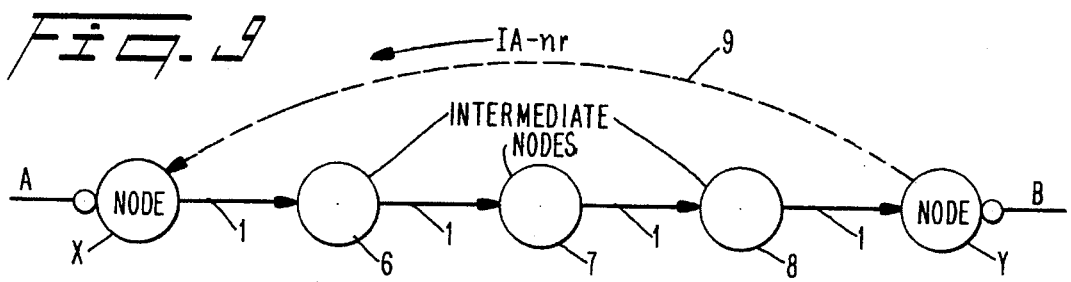
FIG. 9 is a schematic illustration of the coupling route of a connection between A and B, using the method illustrated in FIG. 8.

FIG. 8 illustrates the aforementioned alternative case (b), i.e., the case in which the node which takes the initiative in establishing communication is the node which is allotted the role of connection supplier. In this case, node X is assigned the function of supplier and node Y is assigned the function of connection customer. The connection is assigned in node Y an IA-number which is now selected from among the IA-numbers of the node Y at disposal for this purpose. The IA-number is sent to the connection supplier 11 and also to the connection receiver 12. The connection is then established from the connection creator 13 to the connection receiver 12 and when the connection is to be coupled-up, this is effected in the direction indicated by the arrows in FIG. 9.

It is true of both FIG. 6 and FIG. 8 that when a connection customer 10 and a connection receiver 12 are found in different nodes, it is necessary for the connection customer 10 to communicate with the node in which the connection receiver 12 is located and to request of this latter node an IA-number, which the node then sends to the connection customer.

The connection network 15 may be any network or networks having the function of being able to connect one party with another party on the basis of an address/number. Internally, the connection network/networks handles/handle the connection in any appropriate manner whatsoever with regard to respective networks. The only condition required of the connection network is that it shall be able to couple a virtual connection or is able to establish a virtual connection in the case of a packet-coupled network. On the other hand, the network need not handle any services.

Both the connection creator and the connection receiver include software and equipment with whose help the connection creator communicates with the connection receiver via the connection network 15. The signal network 14 shall be able to pass on signals and is solely used for signalling purposes, whereas the telecommunication network 15 is used to establish a connection route between the end-nodes Y and X, i.e., solely as a coupling path.

Figure 10:
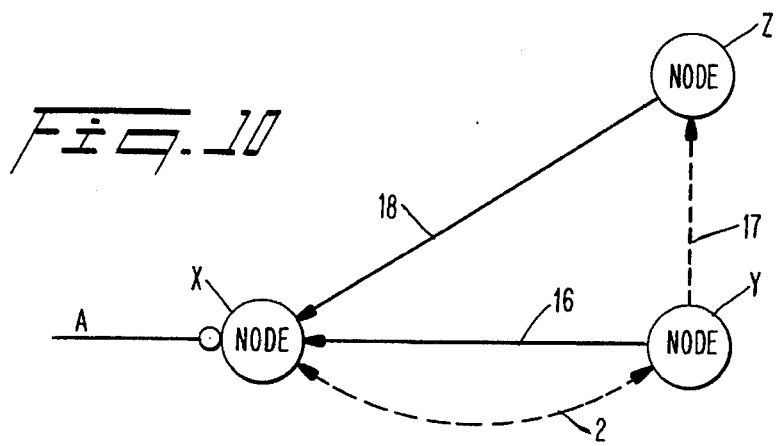
FIG. 10 illustrates another modified embodiment of the inventive communication method.

FIG. 10 illustrates a modified embodiment of the invention which enables an activated, i.e., a not-annulled, IA-number to be reused. FIG. 10 is a graphic illustration which shows three nodes X, Y and Z, where the nodes X and Y correspond to the nodes X and Y in FIG. 6 and where the node Z has been assigned the role of connection creator. For instance, the node Z may have an additional functionality which is lacking in node Y but with which the functionality in X desires to cooperate.

In a manner similar to that described with reference to FIG. 6, the connection customer 10 makes a connection order in the end-node X in the FIG. 10 illustration and allots a reference to this order, namely a specific IA-number. The IA-number is passed over to the node Y via interaction over the signal network, represented by the interaction arrow 2, and the connection supplier 11 in the node Y transfers the IA-number to a connection creator 13 in the node Y. The connection creator initiates the establishment of a coupling route through the connection network 15, up to the node X. The coupling route is represented by the arrow 16 in FIG. 10. The communication phase begins once the connection has been established. The IA-number can be transmitted to the node Z, represented by the interaction arrow 17, upon the initiative of either of the mutually communicating parties. Thus, the connection supplier node is switched from the node Y to the node Z and the new node Z can then connect itself to the node X by using the IA-number. The coupling route thus established is represented by the arrow 18 in FIG. 10. It is only necessary for the node X to break the coupling route 16 to the original supplier node Y in order to be able to carry out the aforedescribed method, without annulling the IA-number. The node X thus parks the call arriving from the user and when the connection creator in node Z calls with the use of the same IA-number as that earlier identifying the node X, it is discovered that the IA-number is allotted a given purpose and connects the connection supplied from Z with the parked call from A. Upon termination of the communication with the node Z, connection 18 is broken. Z can either have taken over the role of supplier from Y, wherein the functionality in Z is responsible for connecting the interaction with X, or Z may be "a subsidiary supplier" to Y, wherein Z returns control to Y upon termination of the activities requested.

The method of switching the IA-number from one node to another can be repeated so that node Z in FIG. 10 can, in turn, transfer the IA-number to still another node having a functionality with which node X desires to cooperate. Node X need not disengage the user A when switching connection suppliers, which means that when seen from the aspect of A, node X provides the functionality which is found in the nodes Y, Z.... In other words, the nodes Y, Z are transparent to A.

Figure 11:
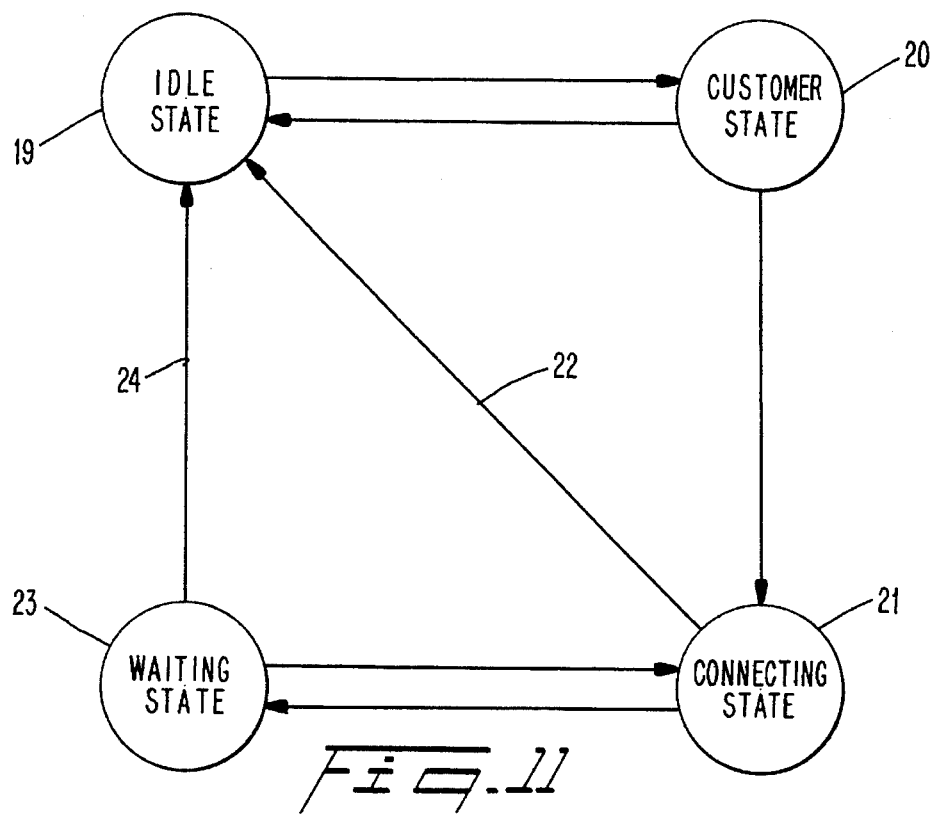
FIG. 11 is a constitutional diagram which illustrates those activities which occur in the communication method illustrated in FIG. 6.

FIG. 11 is a constitutional diagram of node X. Node X takes an idle state 19, in which nothing happens. The node is able to switch from this state 19 to a state in which the node takes the role of customer, the state 20 in which the node also takes a waiting state in expectation of delivery of the service. The node X passes from the customer state 20 to a state 21 in which supply of the communication service is in progress, i.e., the connection is established. With the connection established, the node X can pass from the state 21 to the idling state, arrow 22, or the node X can take a new state 23 in which it awaits a connection from a new supplier node. When communication with the new supplier node is completed, the node X returns to its idle state, as shown by the arrow 24.

A connection supplier utilizes the IA-number when a call is made. The situation may well arise in which a user, any user whatsoever, mistakingly uses an active IA-number when making a call. The user would then be connected to the customer, which would be wrong since the user is not the connection supplier of the IA-number. This would probably result in errors and confusion. In order to prevent this from happening, the connection customer 10 can complete the connection order with a password procedure. The connection receiver may be provided, e.g., with a code receiver which identifies the password, which is transmitted preferably in the form of tone codes. Data communication connections can be identified with special sequences, via the established connection.

If a password procedure is used in combination with an IA-group number, each of several different password procedures may be associated with a respective, separate IA-group number.

An IA-number is chosen when the connection is to be established between service customer and service supplier. The connection is established with the aid of the IA-number. When the connection is established, each of the parties is aware of the respective ports on which the connection arrives and, in the future, can refer to this respective known port. The IA-number can then be released and is available for re-use when establishing new connections.

An IA-number is not associated with any particular equipment, but is associated with a call which requests a service. The program can, however, coact with the equipment.

A service customer can select several IA-numbers, when several service suppliers are to be connected to the service customer simultaneously.

In the example illustrated in FIG. 6, the IA-number comprised a node address together with a reference number selected from the number series of node X. In this case, the reference number represents a unique individual, namely a service order, or request, from the user A.

An IA-number can be used as a group number to connection customers. Two different types of group numbers are found, namely a standard group number and an indexed group number. A standard, or normal, group number is a single IA-number which has been assigned to a group of owners. The IA-group number is then used simultaneously by several customers. It is assumed in this case that the supplier is able to receive several incoming calls simultaneously and to deliver simultaneously services on the various incoming connections.

A group number to the booking center of an airline is an example of a standard group number. Several customer order receivers are seated in the booking center. A large number of people call the booking center all using the standard group number. The calls received from the customers are served by the customer order receivers. As soon as a customer order receiver has delivered a service, he accepts a new call from the waiting group of customers. There is no separate connection between the customer order receiver and customer, and the individuals in the two groups of customer order receiver and customer respectively are mixed this way and that. In this case, the group number can be said to refer to a group-to-group-connection.

Indexed group numbers are used in a situation in which a large number of users call node X with the request to be connected to different destinations B, where it is undesirable to allocate such a large number of IA-numbers, since the IA-numbers available in node X would not be sufficient to provide each user with an individual series number. In this case, there is used an indexed group number which is comprised of a single IA-number which is used as a node address plus an index. The index is used to identify the customer. According to one modified method of the invention, the establishment of a connection between B and a user which seats B with an indexed group number can now be divided into two phases.

In the first phase, the customer transmits the index group number, i.e., node address plus index, to the connection supplier in node Y. The indexed group number is transmitted over the signal network 14 in this phase.

During the first phase, a connection customer individual, a connection receiver individual, a connection supplier individual and a connection creator individual are also generated in a similar manner to that described above with reference to FIG. 6. Still in the first phase, the connection creator individual initiates the establishment of a connection route to the connection receiver, through the telecommunication network 15, by using solely the node address of the indexed IA-group number as the destination address. The connection from B now arrives on a port in node X, although node X still does not know to which of the ports having the parked calls the port having the connection from Y shall be coupled.

In the second phase, the connection creator individual in node Y transmits the aforesaid index allocated by the connection customer in node X, via the connection established from Y to X in the connection network 15. In the case of packet-coupled connections, the index transmission is carried out in a number of initial data sequences. In the case of the circuit-coupled connections, index transmission is effected, for instance, by signalling with the aid of tone-code transmitter equipment in node Y and tone-code receiver equipment in node X. Receipt of the index provides node X with information as to the port on which the parked connection to the customer is found and couples the connection from B to this port. The connection between the user and B is now established.

The method employing index grouped numbers is particularly suited for data networks in which two processors shall cooperate one with the other.

When an IA-number is compared with an indexed group number, it is found that the IA-number discloses node address plus an individual, whereas the indexed group number solely discloses node address by an IA-number plus the use of a method which, by signalling an index over the connection established between the nodes, points to an individual.

Figure 12:
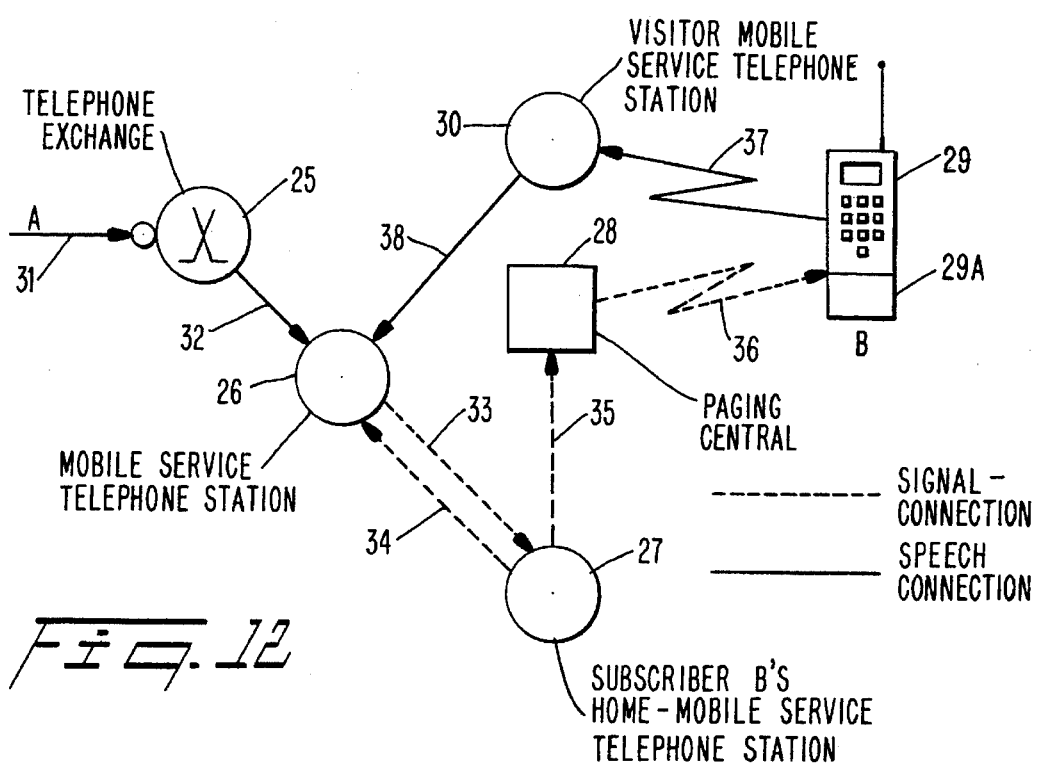
FIG. 12 illustrates an example of the inventive communication method, in which several telecommunication networks cooperate with one another.

FIG. 12 illustrates an example of several coacting networks which utilize the inventive method when coupling a telephone call from one subscriber A in the standard telephone network PSTN to a subscriber B in a mobile telephone network. Reference numeral 25 identifies a telephone exchange in PSTN to which A's call arrives. The mobile service telephone station which lies nearest the telephone exchange 25 is referenced 26. Subscriber B's home-mobile service telephone station in the mobile telephone network is referenced 27. A person paging central in a wide area person paging network (so-called wide area paging) is referenced 28. Subscriber B, which in the illustrated case is a mobile, has a mobile telephone 29 which incorporates a person paging device 29A, in a similar manner to that described under the heading Standpoint of Techniques in Applicant's aforesaid U.S. patent application Ser. No. 686,600. B's mobile telephone 29 is temporarily located within the area covered by a visitor-mobile service telephone station 30.

Assume that the mobile service telephone station 30 is situated in one country, for instance Spain, whereas the home-mobile service telephone station 27 is situated in another country, for instance Sweden.

The interaction between the different units in FIG. 12 are described in the flow sheet of FIG. 13 on the basis of the squares or blocks used therein. The numbers of the blocks shown in FIG. 13 refer to correspondingly numbered arrows in FIG. 12. FIG. 12 illustrates all connections used for signalling purposes with broken arrows, while all speech connections are marked with full line arrows. Block 31 in FIG. 13, and thus also the arrow 31 in FIG. 12, symbolizes an incoming call from A requesting the service of "a conversation with B". A has, in a conventional manner, lifted the telephone receiver and has selected the mobile telephone number of B. The telephone exchange 25 further transmits the call with B's mobile telephone number as the destination, in this case via PSTN, as shown in block 32. Subsequent to routing in PSTN, the call arrives at that mobile service telephone station 26 which is located nearest the telephone exchange 25 geographically. The mobile service telephone station 26 receives the call, checks 33 with the home-mobile service telephone station 27 as to the location of B, is informed 34 that subscriber B is found in Spain, parks 33 the call from A and assigns the call an IA-number containing an address which has the mobile service telephone station 26 as its destination. The mobile service telephone station 26 then signals to B's home-mobile service telephone station 27 and transmits B's mobile telephone number and B's IA-number, block 33. The home-mobile service telephone station 27 acknowledges receipt of these numbers, block 34, and then signals to the person paging central 28 in Spain and orders, block 35, paging of B and discloses B's mobile telephone number and the assigned IA-number. The order is sent over PSTN. The person paging central 28 then, block 36, sends a paging message in a domestic broadcast over the Spanish paging network. The paging message contains B's number and the IA-number. The paging message is caught, or seized, by B's paging apparatus 29A which alerts the mobile telephone 29 which then automatically makes a call on the mobile telephone network, over the guest-mobile-service telephone station 30, block 37. The mobile telephone gives the IA-number as the destination address. The guest-mobile-telephone station 30 then sends the call further, via PSTN, to the mobile service telephone station 26 located nearest A, block 38, which now receives a call which has the IA-number as the destination address. The mobile service telephone station 26 discovers that the number is an IA-number that has been assigned for the purpose of connecting the parked call from A to B, in this case a speech connection. The mobile service telephone station 26 thus couples the speech connection from B to the port on which A's call is parked. The connection from B to A is now established and billing of the call commences, block 39. When either of the parties switches off, the speech channel is released and the mobile service telephone station 26 releases the IA-number. This IA-number can then be reused. It should be noted that the "paging mobile" 29/29A differs from the mobile described in the aforesaid U.S. patent application, in that when alerted the "paging mobile" itself makes a call instead of being called.

FIG. 14 is a block diagram of the connection customer/connection receiver, which includes a computer 40 controlled by schematically illustrated programs 41 which function to create the connection customer individual and the connection receiver individual.

Schematically illustrated equipment 42 transmits and receives a receipt for the connection order and the IA-number associated with said order. Additional equipment 43 is found for receiving and acknowledging the incoming connection.

FIG. 15 is a block schematic of the connection supplier/connection creator, including a computer 44 which coacts with schematically illustrated programs 45 which function to create the connection supplier individual and the connection creator individual. There is also provided equipment 46 for receiving and acknowledging receipt of connection orders, and also equipment 47 for supplying and verifying the supply of the service "connection establishment". A program is also found for further transmitting the IA-number to another node. The program software 45 also includes the aforesaid possibility of node Y maintaining the connection 16 with node X after the IA-number has been transmitted to node Z and node Z, in turn, having established the connection 18 through node X, whereafter the connection 18 is broken when the service supply from node Z is complete and node Y, which is the control or main node, finally orders the connection 16 to be broken. A node, such as node X, will sometimes play the part of connection customer/receiver, and sometimes as connection supplier/creator, and consequently the equipment in FIGS. 14 and 15 is normally integrated in one and the same node (one and the same computer).

FIG. 16 illustrates the inventive embodiment at present, preferably applied in a multinetwork-environment. The user A wishes to communicate with user B over the public telephone network, referenced 50. The user B has, at his disposal, a personal computer 51 having an interface 52 with a telephone 53, which has an operating board 54 provided with dialling buttons and special-function buttons which have, as described below. The operating board also has status-indicating light-emitting diodes and circuits for generating dialling tones. A company telephone exchange 55 serves a large number of users, each of which has the same equipment 51–54 as the user B. This equipment is conventional, with the exception of the interface 52 which is so designed as to enable all of the selections that can be performed by a person through button-selection on the operating board 54 to be also effected from the personal computer. The interface is implemented in the form of software in the otherwise conventional personal computer. The company exchange is a conventional PABX of the Ericsson MD110 type. Among other things, this telephone exchange enables the telephone 53 to handle two independent access ports which provide access to such services as; (a) an incoming call on one access port can be received while a call is in progress on the other access port; (b) parking of calls in progress on one access port and establishing an outgoing call on the other access port; (c) conference calls; (d) transfer of calls so as to enable a party in conversation which terminates on the one access port to be coupled together with a party in conversation which terminates on the other access port while, at the same time, placing the own telephone apparatus free for use, e.g., to receive an incoming call or to make a new outgoing call. The two access ports also enable the own telephone apparatus to be assigned two separate PABX-numbers for different call categories. In the case of the illustrated example of the invention, the one access port is the telephone number which B has published in the telephone directory, hereinafter referred to as the directory number, while the other access port is "private" and is known only to B.

Subscriber A makes a call to subscriber B on B's directory number, the full-line arrow 56, and enters one access port, referenced 57, of the telephone. The computer 51 "answers" the call and parks "the conversation". B is not found in the computer, but is mobile. In this case, B has chosen to set the computer 51 to a program section which causes the computer to seek B over a wide-area paging network. When the computer 51 has parked the call, the computer calls a paging central 59, via the other access port, referenced 58, of the telephone and orders paging of B and discloses B's number in the person paging network. This order is shown by the broken-line arrow. The computer then releases the access port 58. Paging is now carried out in the person paging network. This process is illustrated by the broken-line arrow 61. B has a "paging mobile" similar to that described with reference to FIG. 12. The paging mobile includes a person paging apparatus 62 and a mobile telephone 63 which is alerted by the person paging apparatus 62 and makes an outgoing call to the other access port 58 with the "private" telephone number as the destination. The call, shown by the arrow 64, passes to a base station 65 in the mobile telephone network and from there to the access 58, via the telephone network 50 and the company telephone exchange 55. This call is shown by the broken-line arrow 66. Since only B is an authorized user of the access port 58, the computer now orders "transfer", wherewith the speech connection from B, shown by the full-line arrow 67, is connected together, arrow 68, with the parked speech connection 56 from A. The whole procedure of paging, mobile telephone call and transfer is transparent to A, i.e., A is unaware of any of this. The parties can now talk with one another and when their conversation is completed, the speech connection is broken by the company exchange, in a conventional manner.

The embodiment of the invention described and illustrated in FIG. 16 has been laboratory tested and is rudimentary. Signalling between B and B's computer, is resource demanding, since it takes-over an access port and the access port must be kept secret. Alternatively, a password signalling process could be applied, in which the computer, e.g., with the aid of conventional speech order equipment, could ask the party ringing in on access port 58 to identify itself by transmitting a given tone code combination. The computer would then identify the tone code combination with the aid of a tone code receiver, and if this combination corresponds to the user B, couple the access port 57 and 58 together. The call can be rejected should someone use an IA-number without authority and give a false password. Similarly, the example lacks a node which assigns an IA-number, since the computer 51 serves only one subscriber, in this case B. In a complete system, an IA-number assigning node might comprise a conventional telephone exchange in the telephone network 50 and a computer in the telephone network 50, similar to the computer 51 in the telephone network 50 although faster and of greater capacity, and software which handles several subscribers and assigns to each incoming call from subscribers corresponding to A an IA-number which is chosen from the number series of the node and which "is secret" to all users with the exception of the subscriber B to which the IA-number is then transmitted on the signal network.

However, the rudimentary example includes basic features of the inventive communication method, where among all of the units which take part in the process there may be standard units which need not be reconstructed in any way in order to take part in the communication method. In the example illustrated in FIG. 16, although B is found in the mobile telephone network, he might equally as well be found in some other network and establish a speech connection with A while using the same principles. If the computer 51 was in coaction with conversion equipment for signalling over other networks, and if the computer had electrical secretarial functions of the kind described in copending patent application Ser. No. 08/018,213, subscriber B could be located in any telecommunication network whatsoever and still establish a connection with A. Neither would A need to be a person, but could equally as well be a functionality or a program which seeks cooperation with B. B could also be a functionality or a program.

The example illustrated in FIG. 16 also includes the basic features of the inventive communication method, namely the features of parking an incoming call which uses a directory number, marking the caller engaged to all except the caller to which a "private" number (IA-number) has been assigned, transmitting the IA-number to the called party (in this case done previously), call from the called party with the use of the IA-number, and connecting together the calling and called parties, whereby only the called party reaches the parked call. The example also shows that the telenetwork is only used for coupling connections, the paging network is used only for paging purposes, the mobile telephone network is used only for mobile telephony, i.e., each network is used only for the service for which the network has been constructed in the past. The network concerned is also well able to carry out the service. A comparison should be made in this respect with the earlier mentioned EP-84112925.7, where an initially good cordless-system intended for use within the close proximity of a stationary or fixed conventional telephone apparatus, is modified to form a hybrid-system which although imparting a greater range for cordless-telephones (and therewith attempting to imitate a mobile telephone system), the cordless-telephones become more problematic and difficult to manoeuvre, or operate, and at the cost of an additional apparatus with each separate conventional telephone apparatus. In turn, the additional apparatus must be modified and adapted to all existing conventional telephone apparatuses. Thus, in order for the hybrid-system to function, it is necessary to adapt all system units, one to the other. The inventive communication method enables conventional units to be used without needing to adapt these units, one to the other. When practicing the invention, all of these units can be used effectively for those services for which they were originally constructed. All that is required is the provision of appropriate software.

FIG. 17 illustrates another example of the inventive communication method. The basic structure of this method is similar to the aforegoing. Two functionalities or resources are found, referenced X and Y. X plays the part of a service customer and Y plays the part of the service supplier. A resource is normally a program, and in the illustrated case X and Y are assumed to have corresponding programs. Both X and Y are nodes, partly in a coupling network 1 and partly in a signalling network 9. In this case, the signal network is a packet-coupled network for establishing virtual connections, also called packet-coupled connections. The coupling network 1 enables circuit-coupled connections to be established.

The customer in node X receives a service order from a user A in the coupling network 1. The service order is manifested in the form of a destination address in the coupling network, e.g., a telephone number when the coupling network is PSTN. It is assumed in the FIG. 17 example that the customer in node X is unaware of the node in the coupling network 9 from which the service requested can be supplied. The customer in node X parks the circuit-coupled connection to A, assigns an IA-number to the service order, marks A engaged for all parties with the exception of the party who calls A with the use of the IA-number, and further transmits, represented by arrow 70, the service order and the IA-number in the packet network to a service intermediary node 71. The service order is completed with an "IA-number" which is used only in the signal network. This "IA-number" is hereinafter referred to as IA-S and is of the kind described in copending U.S. patent application Ser. No. 08/018,197. It is assumed in this example that the service intermediary node is unable to deliver the service requested and sends the order to a service further-coupling node 72, which in the case of the illustrated example chooses a supplier 73 to deliver the service. In turn, the supplier chooses a sub-supplier, in this case Y, to deliver the service requested. The supplier 73 sends the service order and the IA-number to the sub-supplier Y. In the case of this example, it is necessary for the sub-supplier Y to confer with X with regard to the service requested, e.g. concerning billing, concerning the time for disconnecting the parked circuit-coupled connection, concerning the times of activating and deactivating equipment located with supplier and customer, synchronization of activities, etc. Instead of conferring about such matters through the long route X-70-71-72-73-Y in the packet network 9, the supplier Y now calls the customer X in the packet network. This call is shown by arrow 74. The destination address used by the supplier Y is the IA-S-number given by the customer X, this number being given as a destination address in the packet-coupled network 9. Upon completion of the aforesaid conference, the supplier Y calls the customer X in the circuit-coupled network 1 while using the IA-number, and the circuit-coupled connection from Y to X is established, as marked by the arrow 75. When the delivery is complete, the circuit-coupled connection 75 is broken, as is also the packet-coupled connection 74. In the case of the described example, a call from Y to X takes place both in the coupling network 1 and in the signal network 9.

Many modifications of the FIG. 17 embodiment are conceivable, for instance exchange of supplier as described with reference to FIG. 10.

FIG. 18 illustrates an example of how the invention can be applied in exchanges in a telecommunication network. All exchanges in the telecommunication network are similarly configured and have the same functionalities. For illustration purposes, only two exchanges 76, 77 are shown, each being "provided" with three "similar" hardware equipment. More specifically, the exchange 76 has a hardware equipment 78, e.g., tone-code-receiving equipment, and the exchange 77 has a hardware equipment 81 which is similar to the hardware equipment of the exchange 76. "The hardware equipment" 79 in the exchange is not found in reality, but is virtual equipment and is illustrated by the broken-line rectangle. On the other hand, corresponding hardware equipment 82 is present in the exchange 77. In this case, it may be, for instance, a matter of expensive hardware equipment, such as, for instance, equipment for speech-controlled voice information. However, the exchange 76 is programmed as though it contained equipment 79 for speech-controlled voice information.

The same applies to the equipment 80, which is virtual and therefore illustrated with a broken-line rectangle. However, the same equipment is not realized in reality in the exchange 77 and is identified by the reference numeral 83. If a call in the exchange 76 requires speech-information equipment to be switched-in, the software in the exchange 76 chooses an IA-number and sends this number together with an order of the service, "makes an originating call while using the IA-number and connects the speech information equipment". The order is transmitted over a signal network, as shown by the broken-line arrow 84. In response to the order, the exchange 77 establishes a coupling route to the exchange 76, schematically illustrated by the full-line arrow 85, and connects its speech information equipment 82. The incoming call is identified in the exchange 76 and reference is made to an IA-number. The exchange 76 then ascertains the purpose for which the IA-number has been assigned and now couples the connection 85 with the call which required the speech information equipment. The exchange 76 thus borrows equipment from the exchange 77.

If, for instance, existing equipment 78 in the exchange 76 breaks down, the exchange can borrow corresponding functionality 81 in the exchange 77 with a similar IA-number method to that just described.

Another advantage afforded by virtual equipment is that the standardized protocol of the telecommunication network is used for the connection 85, while the network operator is able to use an own signal protocol for the signal connection 84.

The novel terminology provides tools for describing clearly and unambiguously those situations which conventional terminology is unable to handle. Furthermore, implementation of the invention enables communication to be established between two people and not, as is now conventional, between two pieces of equipment controlled by the network. The simple case in which subscriber A wishes to make a telephone call to subscriber B can be mentioned as an example in this respect. Subscriber B, however, has requested the service "temporary transfer (diversion)", which in this case means that B has switched his telephone over to his secretary S. Consequently, all calls directed to B will be redirected to S. Further assume that the secretary S is engaged on the telephone when A calls. A gets an engaged tone and then requests a "re-call service", which means that when S has terminated the call and replaces the receiver, A will be connected to S. But this is not what A desires; A wishes to talk to B. In his capacity as user, A is unable to state his wishes, but can only dial a number. Subscriber A is not aware of where the number reaches, i.e. if it reaches B, B's secretary, a temporary transfer number, a telephone answering machine, or some other equipment. In its facility as user, subscriber B is only a piece of equipment. With the novel terminology and the novel method of procedure, however, B is considered as the person B who shall supply the connection to A. When B desires to use an electronic secretary, the secretary can serve as an intermediary and B communicates with the intermediary in the manner described in copending patent application Ser. No. 08/018, 213 entitled "A Method of Supporting communication". Thus, when practicing the novel method, it is the person B who establishes contact with the person A. The role division between the parties concerned is clear and unambiguous, i.e., a division into connection customer, connection supplier, connection creator and connection receiver, even in those cases which involve intermediaries.

I claim:

1. A method by means of which a first node in a telecommunication network establishes cooperation with hardware equipment which is present in a second node in a second telecommunication network and which can be connected to the first telecommunication network through the intermediary of a third telecommunication network, comprising the steps of:

assigning to the desired cooperation between the first node and said hardware equipment a temporary interaction number which is associated with the desired cooperation;

transmitting the temporary interaction number to the second node;

initiating, by the second node, the establishment of a connection to the first node through said third telecommunication network using the temporary interaction number as a destination address of the first node;

connecting the hardware equipment to said connection; and releasing said interaction number after the setup of said connection.

2. A method according to claim 1, wherein the first node is programmed to include virtual hardware equipment corresponding to said hardware equipment in said second node, the first node allocates an IA-number to its virtual hardware equipment and sends the IA-number to the second node, and the second node establishes a connection with the first node while using the IA-number and connects its hardware equipment to said connection.

3. A method according to claim 1, wherein the temporary interaction number is transmitted over a signalling network.

4. A method according to claim 1, wherein the second node passes the temporary interaction number to a third node; and the third node initiates the establishment of a connection to the first node with the use of the transmitted, temporary interaction number.

5. A method according to claim 1, wherein the first and second telecommunication networks are a common network, and the third telecommunication network is a network different from the common network.

6. A method in accordance with the claim 1, said first node comprising an item selected from the group that consists of hardware equipment, a program controlled computer, and a program, said item desiring cooperation with said hardware equipment in said second node, wherein said method comprising the further steps of;

assigning, in said first node, said temporary interaction to the selected item and, upon reception of said connection, connecting said selected item to said connection.

7. A method according to claim 6, said method further comprising the step of:

marking said selected item in said first node as occupied to all parties with the exception of the hardware equipment that uses said temporary interaction number reserved for the desired cooperation.

8. A method according to claim 6, said method further comprising the steps of:

including in the temporary interaction number a node address plus a temporary individual identifier;

choosing the temporary individual identifier from a number series which is internal for the first node and is held secret;

receiving, in said first node, an incoming call using said interaction number;

transmitting, over the connection at which said incoming call arrives to said first node, said individual identifier to said first node;

identifying, in said first node, said individual identifier of said incoming call; and connecting the incoming call using said identifier with the hardware equipment assigned to said individual identifier.

9. A method according to claim 8, wherein the step in which the second node initiates the establishment of a connection with the aid of the temporary interaction number is completed with a password procedure.

10. A method in accordance with claim 1, wherein a first subscriber initiates communication with a second subscriber, comprising the steps of:

the first subscriber making a call over the conventional telephone network and as destination address gives the mobile telephone number of the second subscriber;

routing the call to a mobile service telephone station;

parking the incoming call at the mobile service telephone station, assigning to said call an IA-number, that as address has the mobile service telephone station as destination, signaling to the home mobile service telephone station of the second subscriber and over the signal path transmitting the mobile telephone number of the second subscriber as well as said IA-number and then monitoring its incoming ports in respect to an incoming call which as destination indicates the IA-number;

the home mobile service telephone station transmitting to a paging central a request to page the second subscriber and as a reference to the desired communication giving the mobile telephone number of the second subscriber and the IA-number;

the paging central broadcasting a paging message to the second subscriber, said message comprising the IA-number;

the second subscriber upon receipt of the paging message making an outgoing call and as destination gives the IA-number;

the outgoing call is routed to the mobile service telephone station; and detecting at the mobile service telephone station the port on which there is an incoming call which as its destination has the IA-number and interconnecting said port with the parked call.

11. A method in accordance with claim 10, wherein the second subscriber makes the outgoing call over a mobile telephone network.

12. A method according to claim 10, wherein the second node includes a program controlled computer which is programmed to establish a connection to the first node with the use of the temporary interaction number as the destination address.

13. A method according to claim 11, wherein the program controlled computer of the second node includes a memory which contains data as to which functionalities are found available in the second telecommunication network and the destination addresses to those nodes in which these functionalities are found;

the program controlled computer is programmed to search the memory for the functionality desired in response to a functionality order; and when the computer as a result of this memory search finds the node which has the desired functionality, called the target node, the program functions to send the functionality order to the target node, together with the temporary interaction number.

14. A method by means of which a first node in a telecommunication network establishes cooperation with a program controlled computer which is present in a second node in a second telecommunication network and which can be connected to the first telecommunication network through the intermediary of a third telecommunication network, comprising the steps of:

assigning to the desired cooperation between the first node and said program controlled computer a temporary interaction number which is associated with the desired cooperation;

transmitting the temporary interaction number to the second node;

initiating, by the second node, the establishment of a connection to the first node through said third telecommunication network using the temporary interaction number as a destination address of the first node;

connecting the program controlled computer to said connection; and releasing said interaction number after the setup of said connection.

15. A method according to claim 14, wherein the first node is programmed to include a virtual program controlled computer corresponding to said program controlled computer said second node;

the first node allocates an IA-number to its virtual program controlled computer and sends the IA-number to the second node; and the second node establishes a connection with the first node while using the IA-number and connects its program controlled computer to said connection.

16. A method according to claim 14, wherein the temporary interaction number is transmitted over a signalling network.

17. A method according to claim 14, wherein the second node passes the temporary interaction number to a third node; and the third node initiates the establishment of a connection to the first node with the use of the transmitted, temporary interaction number.

18. A method according to claim 14, wherein the first and second telecommunication networks are a common network, and that the third telecommunication network is a network different from the common network.

19. A method in accordance with claim 14, said first node comprising an item selected from the group that consists of a hardware equipment, a program controlled computer and a program, said item desiring cooperation with said program controlled computer in said second node, wherein said method comprises the further step of:

assigning at said first node said temporary interaction to the selected item and upon reception of said connection, connecting said selected item to said connection.

20. A method according to claim 19, said method further comprising the step of:

marking said selected item in said first node as occupied to all parties with the exception of the program controlled computer that uses said temporary interaction number reserved for the desired cooperation.

21. A method according to claim 19, said method further comprising the steps of:

including in the temporary interaction number a node address plus a temporary individual identifier;

choosing the temporary individual identifier from a number series which is internal for the first node and is held secret;

receiving, in said first node, an incoming call using said interaction number;

transmitting, over the connection at which said incoming call arrives to said first node, said individual identifier to said first node;

identifying, in said first node, said individual identifier of said incoming call; and connecting the incoming call using said identifier with the program controlled computer assigned to said individual identifier.

22. A method according to claim 21, wherein the step in which the second node initiates the establishment of a connection with the aid of the temporary interaction number is completed with a password procedure.

23. A method by means of which a first node in a telecommunication network establishes cooperation with a program which is present in a second node in a second telecommunication network and which can be connected to the first telecommunication network through the intermediary of a third telecommunication network, comprising the steps of:

assigning to the desired cooperation between the first node and said program a temporary interaction number which is associated with the desired cooperation;

transmitting the temporary interaction number to the second node;

initiating, by the second node, the establishment of a connection to the first node through said third telecommunication network using the temporary interaction number as a destination address of the first node;

connecting the program to said connection; and releasing said interaction number after the setup of said connection.

24. A method according to claim 23, wherein the first node is programmed to include a virtual program corresponding to said program in said second node;

the first node allocates an IA-number to its virtual program and sends the IA-number to the second node; and the second node establishes a connection with the first node while using the IA-number and connects its program to said connection.

25. A method according to claim 23, wherein the temporary interaction number is transmitted over a signalling network.

26. A method according to claim 23, wherein the second node passes the temporary interaction number to a third node, and the third node initiates the establishment of a connection to the first node with the use of the transmitted, temporary interaction number.

27. A method in accordance with claim 23, said first node comprising an item selected from the group that consists of hardware equipment, a program controlled computer, and a program, said item desiring cooperation with said program in said second node, wherein said method comprises the further step of:

assigning in said first node said temporary interaction to the selected item and, upon reception of said connection, connecting said selected item to said connection.

28. A method according to claim 26, said method further comprising the step of:

marking said selected item in said first node as occupied to all parties with the exception of said program that uses said temporary interaction number reserved for the desired cooperation.

29. A method according to claim 26, said method further comprising the steps of:

including in the temporary interaction number a node address plus a temporary individual identifier;

choosing the temporary individual identifier from a number series which is internal for the first node and is held secret;

receiving, in said first node, an incoming call using said interaction number;

transmitting, over the connection at which said incoming call arrives to said first node, said individual identifier to said first node;

identifying, in said first node, said individual identifier of said incoming call; and connecting the incoming call using said identifier with the program assigned to said individual identifier.

30. A method according to claim 26, wherein the step in which the second node initiates the establishment of a connection with the aid of the temporary interaction number is completed with a password procedure.

* * * * *